Aug. 9, 1949.                    C. SYMENS                    2,478,605
                                 CAGE TRAP
                            Filed Feb. 25, 1946
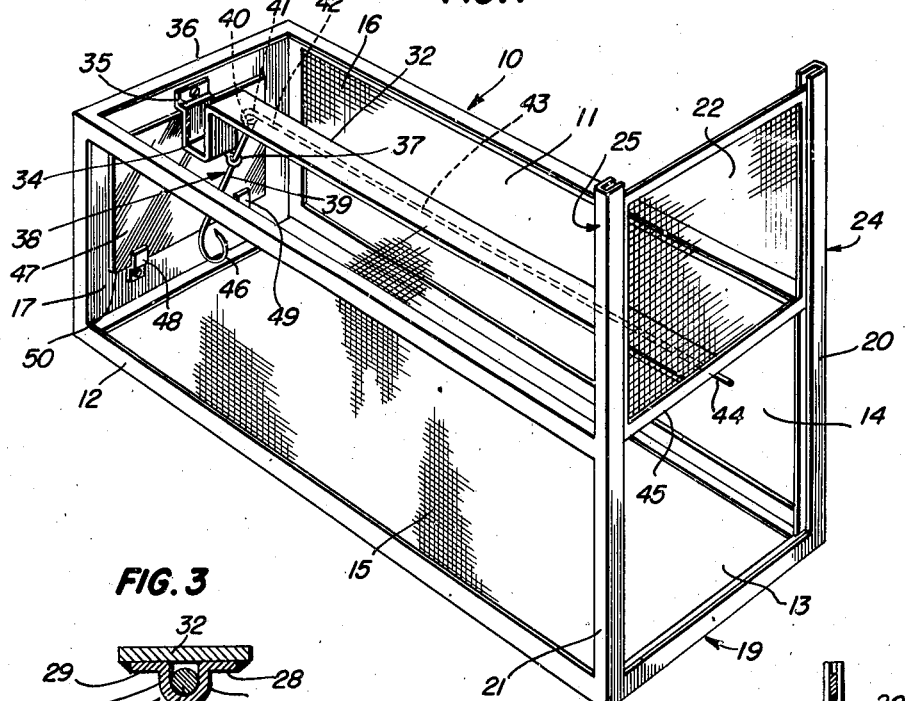
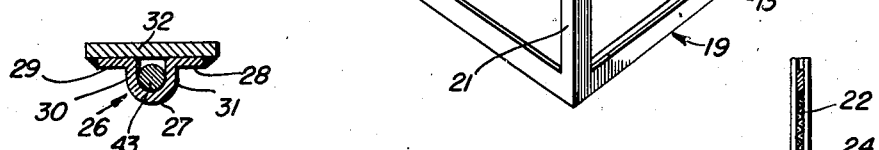
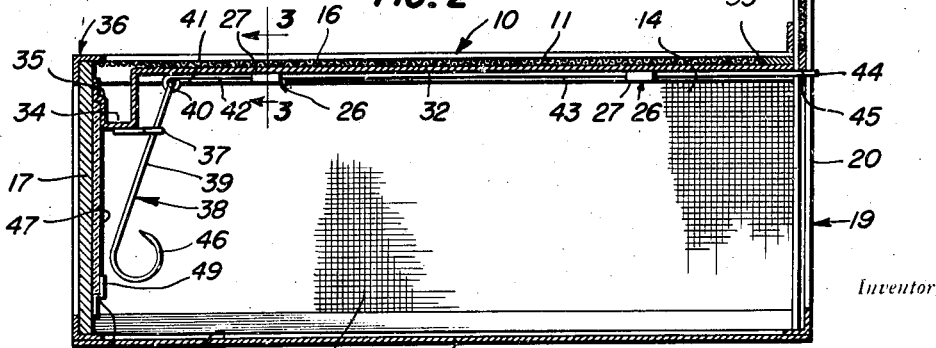
Inventor
CHARLES SYMENS
By Clarence A. O'Brien
and Harvey B. Jacobson
Attorneys Patented Aug. 9, 1949

2,478,605

UNITED STATES PATENT OFFICE 2,478,605

CAGE TRAP

Charles Symens, Freeport, Ill.

Application February 25, 1946, Serial No. 649,889

1 Claim. (Cl. 43—61)

The invention which is herein disclosed is that of a trap and has for its object to provide a trap so formed as to invite confidence of the game sought.

Another object of this invention is to provide a trap fully lighted inside.

Another object of the invention is to provide a trap provided with a mirror in which the quarry will be reflected, thus inviting confidence.

Other features and advantages will become more readily apparent from the following description and the accompanying illustrative drawings in which:

Figure 1 is a perspective view of the trap,

Figure 2 is a longitudinal sectional view thereof, and

Figure 3 is a sectional view taken on line 3—3 of Figure 2.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the scope of the present device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout and in which 10, refers to the invention generally and 11, a cage of any desired size, length or shape, depending upon the particular game to be caught therein. The cage consists of a frame 12 surrounding all sides 13, 14, 15, 16 and 17 and which is either fine or coarse wire netting 18, or bars may be used for the said sides. The end 19 of the cage is to be opposite the rear wall 17, and forms a doorway or entrance, the vertical frame members 20 and 21 being of channel iron in which the trap door 22 is slidably mounted. The said members 20 and 21 extend above the top side or wall 16 for a distance equal to the depth of said door as indicated at 24 and 25.

Mounted longitudinally of the top side or wall 16 is a housing 26 consisting of a U-shaped member 27 with flanges 28 and 29 extending horizontally from the upper ends of its arms 30 and 31, which flanges are secured to a strap on plate 32, the forward end of which is fixed to the forward edge 33 of wall 16 and its rear is formed into a depending U-shaped member 34 the outer arm 35 being removably secured to the wall 17. Projecting from this U-shaped member is an eye 37 forming a fulcrum for the lever trigger 38, the shank 39 of which projects through the eye and has its upper end 40 linked to an eye 41 formed on the rear end 42 of a long rod 43 the tip end 44 of which is adapted to be extended outwardly under and support the lower edge 45 of the door 22 when raised and in which position the hook end 46 of the trigger will be pulled rearwardly.

On the rear wall 17 is mounted a mirror 47 by means of the arm 35 of said U-shaped member 34, and the clips 48 and 49 which support the lower edge 50 of said mirror. From the preceding specification it will at once be obvious that when an animal entering the trap attempts to pull bait from the hook 46 the rod disposed in the housing 26 will be drawn rearwardly, withdrawing its tip 44 from under the door 22, allowing it to fall and thus caging the animal.

From the foregoing specification it will become apparent that the invention disclosed will adequately accomplish the functions for which it has been designed and in an economical manner.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described the invention, that which is claimed to be new and desired to be procured by Letters Patent is:

An animal trap comprising a box-like cage open at one end, a fixed closure at one end of said cage, a mirror removably carried by the inner face of said fixed closure opposing the open end of said cage, vertically disposed channel shaped guide tracks rigidly carried by said cage at its open end, a slidable closure mounted in said guide tracks for closing the open end of said cage, a longitudinal guide plate carried by said cage, said plate terminating in a U-shaped portion adjacent said fixed closure, one of the legs of said U-shaped portion holding the mirror in a removable position on the fixed closure, a bar slidably mounted on said plate, one terminal of said bar being extendable beneath said slidable closure to support the same in a raised position, an eye member carried by the U-shaped portion of said plate, and a bait hook hinged to said bar and pivotally mounted in said eye member.

CHARLES SYMENS.

REFERENCES CITED

The following references are of record in the file of this patent:

UNITED STATES PATENTS

| Number | Name | Date |
| --- | --- | --- |
| 443,975 | Pead | Dec. 30, 1890 |
| 924,237 | Kampfe | June 8, 1909 |
| 1,218,514 | Blakeslee | Mar. 6, 1917 |
| 1,406,028 | Keller | Feb. 7, 1922 |
| 1,735,786 | Pearl | Nov. 12, 1929 |